June 17, 1952 W. C. SMULLEN 2,601,177
AUTOMOBILE TABLE WITH FOLDING SEAT HANGER
Filed Oct. 23, 1950 2 SHEETS—SHEET 1
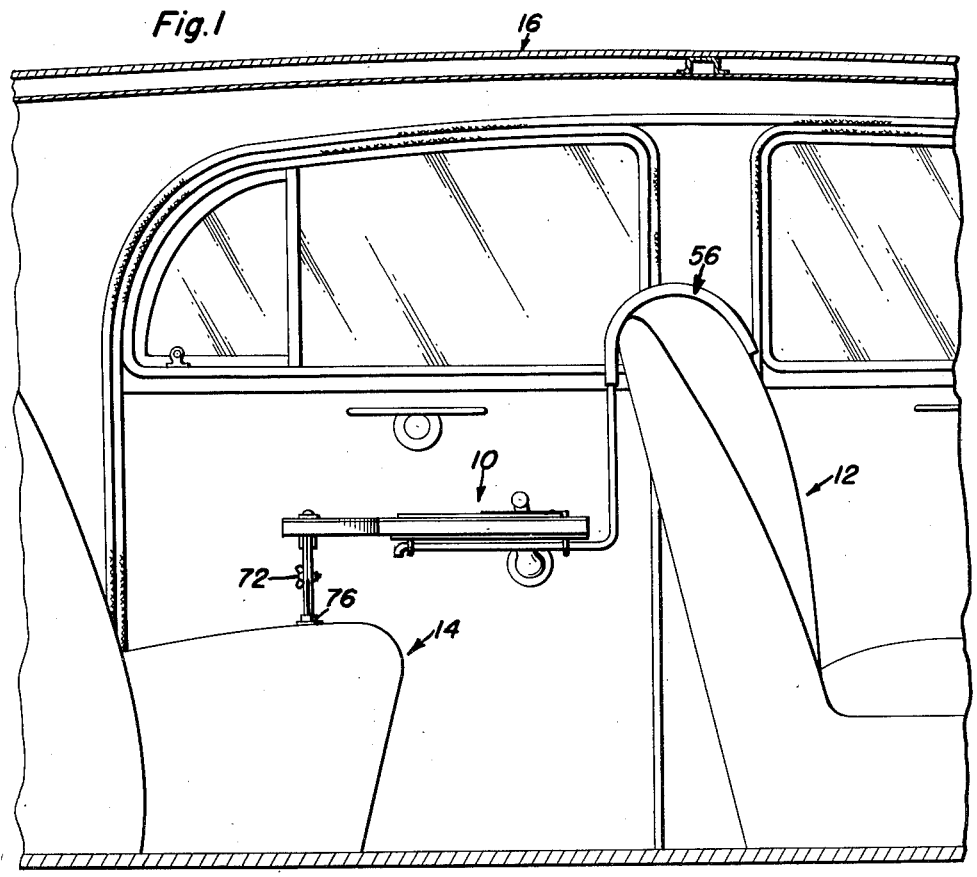
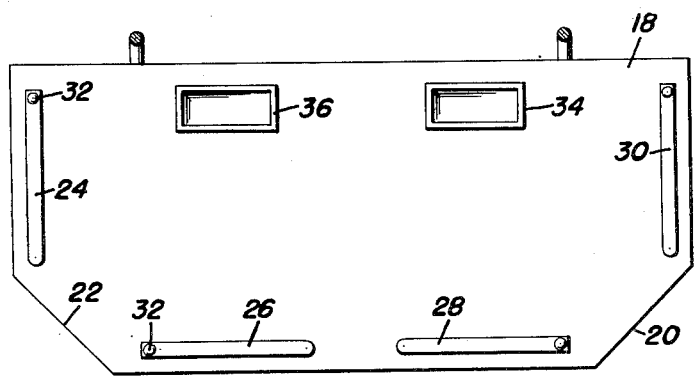
Willard C. Smullen
INVENTOR.

June 17, 1952 W. C. SMULLEN 2,601,177
AUTOMOBILE TABLE WITH FOLDING SEAT HANGER
Filed Oct. 23, 1950 2 SHEETS—SHEET 2
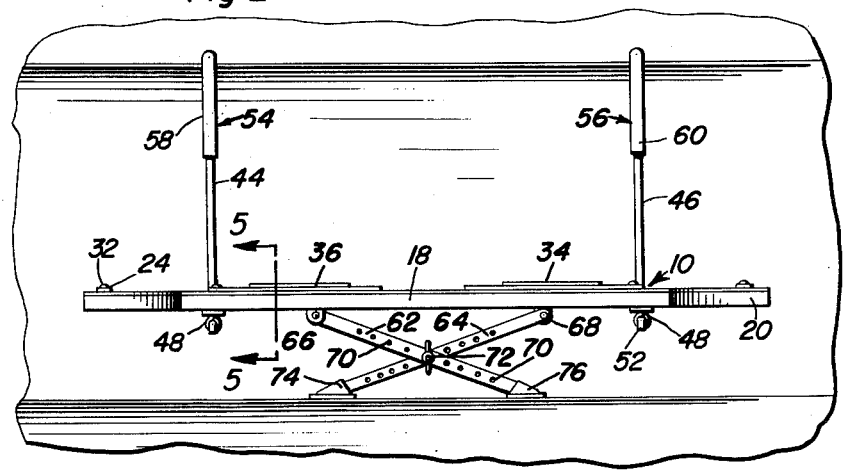
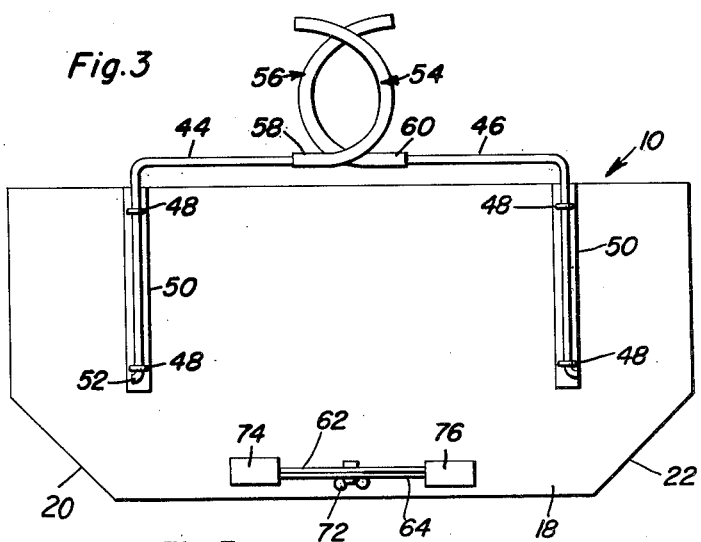
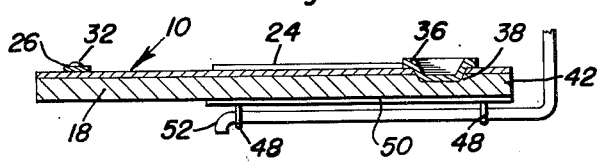
Willard C. Smullen
INVENTOR.
BY *Clarence A. O'Brien
and Harvey B. Jacobson*
Attorneys Patented June 17, 1952

2,601,177

UNITED STATES PATENT OFFICE 2,601,177

AUTOMOBILE TABLE WITH FOLDING SEAT HANGER

Willard C. Smullen, Decatur, Ill.

Application October 23, 1950, Serial No. 191,549

1 Claim. (Cl. 311—21)

The present invention relates to improvements in folding tables and more particularly to a readily usable table especially well adapted for use in the tonneau of automobiles and the like.

An object of the present invention is to provide a foldable table for automobiles which may be used for a variety of purposes, such as a play table for children, a drive-in table, an engineer's drafting or layout board or a sportsman's table for assembling lures, etc.

A further object of the present invention is to provide an improved folding table which is adapted to be supported by the back portion of the front seat and which has a pair of foldable legs for engagement with the seat portion of the back seat.

Another object of the present invention is to provide a folding automobile table which is of compact form when folded and wherein the supporting elements for the table provide a handle for carrying the folded table.

Various other objects and advantages will become apparent from the detailed description to follow. The best form in which I have contemplated applying my invention is clearly illustrated in the accompanying drawings, wherein:

Figure 1 is a side elevational view of the folding automobile table when in position in the rear part of an automobile, the automobile being shown in cross section with parts broken away;

Figure 2 is a rear elevational view of the foldable table of Figure 1;

Figure 3 is a bottom plan view of the table with its folding parts in folded relation;

Figure 4 is a top plan view of the table with portions in section; and,

Figure 5 is a vertical transverse sectional view taken substantially along the plane of line 5—5 of Figure 2.

Briefly summarized the invention appertains to a portable folding, temporarily usable, table expressly designed for use in the tonneau of an automobile between the trailing side of the backrest of a front seat and the cushion of a backseat, the same being collectively supported by the back rest and cushion and comprising a platform to assume a horizontal position with a forward marginal edge adapted to overlie the stated cushion, a pair of hanger and supporting elements, each of generally L-shaped form and having a horizontal limb portion underlying and hingedly attached to said platform and vertical limbs to assume spaced parallelism in respect to the aforementioned backrest, the upper end portions of the vertical limbs being formed into hooks, said hooks being curved and bent to conformably engage over the upper edge of the backrest, a pair of rigid members having corresponding end portions hingedly attached to the underside of the rear edge portion of said platform and providing legs, the latter being provided with selectively usable registerable apertures and disposed in crossed relation, bolt and nut means passing through a pair of aligned apertures in said legs, and cushioned feet carried by the free end portions of said legs, said feet to rest upon said cushion and said legs being centered in respect to the opposite transverse end portions of the platform so as to permit the legs to be straddled by the legs of the occupant of the rear seat when using the platform as a table, desk or the like.

Referring more particularly to the drawings, wherein like numerals designate like parts throughout, the numeral 10 designates generally the foldable table of the present invention while the numeral 12 designates the front seat and the numeral 14 designates the rear seat of the automobile 16.

The foldable table 10 is comprised of a platform 18 which is of substantially rectangular form having beveled corner portions 20 and 22. The platform 18 may be formed of plywood covered with formica or linoleum. Of course, other materials may be employed as desired.

Secured to the upper surface of the platform 18 are a plurality of spring bands 24, 26, 28 and 30 which are secured to the platform by pins 32. The spring bands are adaptable for resiliently holding papers and the like on the platform. The platform 18 is also formed with rectangular cup-shaped recesses in which are received the trays 34 and 36. Trays of various sizes and shapes may be provided for attachment to the platform 18. As seen best in Figure 5, the recess 38 for receiving a tray extends through the formica or linoleum covering and into the plywood body to give a firm holding of the tray.

As seen best in Figure 3, a pair of supporting elements 44 and 46 are provided and these are pivotally attached to the underside of the platform 18 by means of the eye screws 48. The eye screws 48 are attached to the elongated strips 50 which may be secured to the underside of the platform by any desired means. Each of the supporting elements 44 has an angulated end portion 52 for retaining the supporting elements from removal through the eye screws 48. The supporting elements 44 and 46 are also formed with gooseneck portions 54 and 56, the arcuated portions of which are adapted to rest on the upper portion of the back of the front seat for support thereby. The arcuated portions 54 and 56 are preferably covered with rubber tube elements 58 and 60 for engagement with the front seat to protect the same.

At one edge portion of the platform 18 and on the underside thereof is provided a pair of pivotally mounted foot supports 62 and 64 which pivot on the pivot supports 66 and 68 secured to the platform 18. Each of the foot supports 62 and 64 is provided with a plurality of longitudinally spaced apertures 70 whereby when the foot supports are in the desired angular relation, the wing screw 72 may be passed through the preselected apertures which are in alignment for clamping the supports together. The lower ends of the supports 62 and 64 are provided with rubber-like feet 74 and 76 for engagement with the upper surface of the seat portion of the back seat.

From the foregoing description, taken in conjunction with the drawings, it is believed that a device has been provided which will accomplish all of the objects hereinabove set forth. The manner in which the foldable table may be mounted in an automobile is readily obvious, and when it is desired to completely fold the table, the swingable supporting elements 44 and 46 are pivoted to the position shown in Figure 3 and the foot supports 62 and 64 are pivoted into parallel relation with the wing screw 72 clamping them together. The gooseneck portion of each of the supporting elements overlies the other to provide a hand grip for carrying the foldable table.

Having thus described the invention, what is claimed as new is:

For use in the tonneaus of an automobile between the trailing side of the back rest of a front seat and the cushion of a back seat and collectively supported by said back rest and cushion, a portable folding temporarily usable table construction comprising a platform to assume a horizontal position with a forward marginal edge spaced from the stated backrest and a rearward marginal edge adapter to overlie the stated cushion, a pair of hanger and supporting elements, each being of general L-shaped form and having a horizontal limb portion underlying and hingedly attached to said platform and a vertical limb portion to assume spaced parallelism in respect to the aforementioned backrest, the upper end portions of the vertical limbs being formed into hooks, said hooks being curved and bent to conformably engage over the upper edge of the back rest, a pair of rigid members having corresponding end portions hingedly attached to the underside of the rear edge portion of said platform and providing legs, the latter being provided with selectively usable registrable apertures and disposed in crossed relation, bolt and nut means passing through a pair of aligned apertures in said legs, and cushioned feet carried by the free end portions of said legs, said feet to rest upon said cushion and said legs being centered in respect to the opposite transverse end portions of the platform so as to permit the legs to be straddled by the legs of the occupant of the rear seat when using the platform as a table, desk or the like.

WILLARD C. SMULLEN.

REFERENCES CITED

The following references are of record in the file of this patent:

UNITED STATES PATENTS

| Number | Name | Date |
|---|---|---|
| 920,747 | Hughes | May 4, 1909 |
| 1,373,506 | Hoyt | Apr. 5, 1921 |
| 1,873,826 | Mitchell et al. | Dec. 22, 1931 |
| 2,101,686 | Offcutt | Dec. 7, 1937 |
| 2,160,958 | Critchlow | June 6, 1939 |
| 2,460,712 | Petterson | Feb. 1, 1949 |
| 2,471,003 | Monahan | May 24, 1949 |
| 2,476,620 | Nichols | July 19, 1949 |
| 2,540,392 | Haskell | Feb. 6, 1951 |
| 2,556,724 | Hubsch | June 12, 1951 |

FOREIGN PATENTS

| Number | Country | Date |
|---|---|---|
| 319,155 | Great Britain | Sept. 19, 1929 |